UNITED STATES PATENT OFFICE.

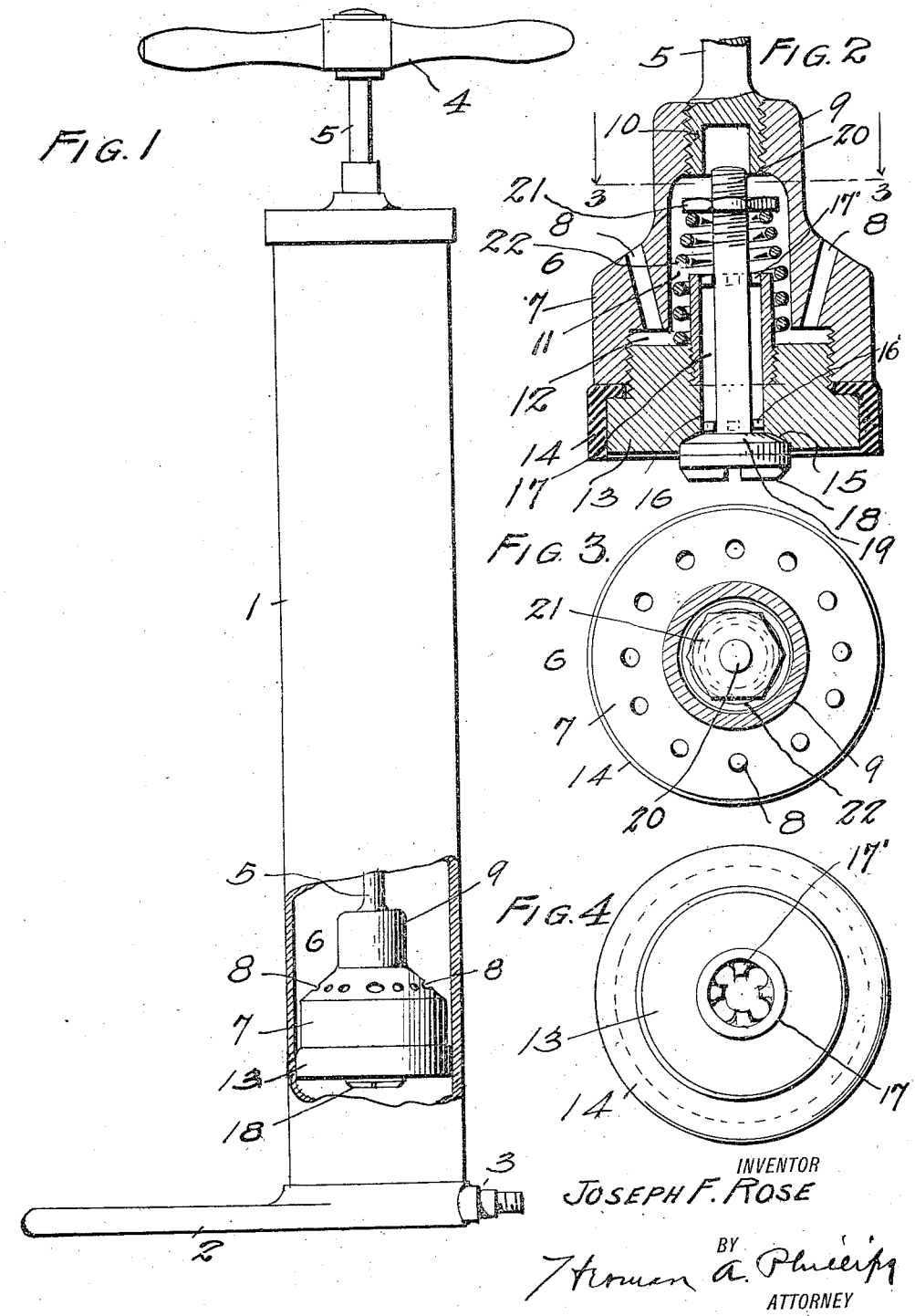

JOSEPH F. ROSE, OF CHEROKEE, IOWA.

HAND-PUMP.

1,293,936.   Specification of Letters Patent.   Patented Feb. 11, 1919.

Application filed January 2, 1918.   Serial No. 210,060.

*To all whom it may concern:*

Be it known that I, JOSEPH F. ROSE, a citizen of the United States, residing at Cherokee, in the county of Cherokee and State of Iowa, have invented certain new and useful Improvements in Hand-Pumps, of which the following is a specification.

The present invention relates to improvements in hand pumps, of the pneumatic type, and designed especially for use in connection with pneumatic tires for automobile and other similar wheels.

The primary object of the invention is the provision of a pump of this character, that is comparatively inexpensive in cost of production, light and durable, and simple both in construction and operation, but withal efficient in performing the functions for which it is intended.

The invention essentially consists in certain novel combinations and arrangements of parts in the plunger or reciprocating piston, which is of the rectilinear type and carries its own valve.

In the accompanying drawings I have illustrated one complete example of the physical embodiment of my invention constructed according to the best mode so far devised for the practical application of the principles of my invention, and which has proven highly satisfactory, in actual use.

Figure 1 is a view in elevation, partly broken away, of a well known type of pump having the features of my invention embodied therein.

Fig. 2 is an enlarged, sectional view of the piston.

Fig. 3 is a plan vew, partly in section on line 3—3 of Fig. 2.

Fig. 4 is a top plan view of the head of the piston.

In the preferred form of my invention as illustrated in the drawings I have depicted the usual cylinder 1 having the pump base or foot piece 2, the outlet 3, handle 4 and stem 5, all of well known or approved type, and the piston, as a whole, is designated by the numeral 6, and designed to reciprocate in the cylinder, in rectilinear direction as usual.

The body of the piston is designed as 7, and is cylindrical in cross section and formed with air passages 8, and a reduced extension 9 into which the stem 5 is threaded, the stem being formed hollow, as at 10, within the extension 9. Within the body 7 a chamber 11 is centrally formed, and the open end of the body is enlarged, as 12 to accommodate the piston head 13 that is threaded into the open end 12 of the body, and it will be noted that a chamber or space is formed between the head and body into which the passages 8 open and terminate. A leather gasket 14 is shown as clamped between the body and head of the piston to insure air tight frictional contact with the interior walls of the cylinder 1 in which the piston reciprocates.

The head 13 of the piston has a central opening, which expands into the tapered valve seat 15, the opening being designated 16, and into this opening a tube 17 is threaded, forming a continuation of the opening 16.

The valve 18 which closes the seat 15 has a leather washer 19, and the stem 20 of the valve extends up through the opening 16 and tube 17, and is guided in its movement therein by the lugs 16' and 17' on the head and on the tube. The end of the stem is threaded for the nut 21 and this nut holds the spring 22 between itself and the head 13 of the piston.

The operation of the pump will be readily understood, and it will be sufficient to say that upon the up-stroke of the piston the air in the cylinder passes through passages 8, chamber 9, tube 17 and opening 16, forcing the valve from its seat, against the tension of the spring 22, and then upon the down-stroke of the piston, the valve is closed, and the air beneath the piston is compressed and forced through the outlet 3 in the cylinder 1.

In its movement the stem 20 of the valve is guided by the lugs 16' and 17' and prevented from wabbling, and the valve itself is insured a proper and accurate seating in the tapered opening 15. The tension of the spring may be adjusted by turning the nut 21, increasing or reducing the pressure required to move it from its seat, and this adjustment may be readily accomplished with facility and despatch by unscrewing the head from the body and removing the head with its valve, stem and spring complete, from the body. After adjustment the parts may be quickly assembled again, and are ready for use.

In this manner, a simple, but compact, accurate and durable device is provided for performing the functions of a comparatively perfect pump of this character.

What I claim is:—

The combination in a hand pump as described with the hollow piston body formed with air passages, of a head threaded into the body and forming a chamber and a gasket clamped between the head and body, said head having an open center terminating in a valve seat, a spring pressed valve adapted to fit the seat and having a stem projecting through said head into the hollow body, and a guide tube for the stem threaded into the head and projecting into the hollow piston body.

In testimony whereof I affix my signature.

JOSEPH F. ROSE.

Copies of this patent may be obtained for five cents each, by addressing the "Commissioner of Patents, Washington, D. C."